United States Patent
Siciliano et al.

(12) United States Patent (10) Patent No.: US 6,209,694 B1
(45) Date of Patent: Apr. 3, 2001

(54) MODULAR POWER LINE FOR AN ELECTRIC VEHICLE

(75) Inventors: Vito Siciliano, Pieve Ligure; Alcide Del Naja, Naples, both of (IT)

(73) Assignee: Ansaldo Trasporti S.p.A., Naples (IT)

( * ) Notice: Subject to any disclaimer, the term of this patent is extended or adjusted under 35 U.S.C. 154(b) by 0 days.

(21) Appl. No.: 09/367,649

(22) PCT Filed: Feb. 20, 1998

(86) PCT No.: PCT/IT98/00033

§ 371 Date: Dec. 8, 1999

§ 102(e) Date: Dec. 8, 1999

(87) PCT Pub. No.: WO98/36931

PCT Pub. Date: Aug. 27, 1998

(30) Foreign Application Priority Data

Feb. 21, 1997 (IT) ................................ T097A0145

(51) Int. Cl.[7] .................................................. B60M 1/00
(52) U.S. Cl. .............................................................. 191/18
(58) Field of Search .............................. 191/2, 6, 12 R, 191/14, 16, 17, 18, 19, 22 R, 23 R (56) References Cited

U.S. PATENT DOCUMENTS

| | | | |
|---|---|---|---|
| 767,534 | * 8/1904 | Whittier | 191/18 |
| 781,984 | * 2/1905 | Alexander | 191/18 |
| 807,199 | * 12/1905 | Palmer | 191/18 |
| 898,216 | * 9/1908 | Granger | 191/18 |
| 5,810,136 | * 9/1998 | Sciciliano et al. | 191/18 |

* cited by examiner

*Primary Examiner*—Mark T. Le
(74) *Attorney, Agent, or Firm*—Quarles & Brady

(57) ABSTRACT

A modular power line (1) defined by a number of elongated enclosures (4), each housing a conducting line (27) and an elastically deformable strip element (60) of finite length, which interacts with a magnetic field generated by an electric vehicle (80) to attract a portion (60*a*) of the strip element (60) into a contact position in which an electric connection is established between the conducting line (27) and at least one power plate (34) outside the enclosure (4). The enclosure carries, at each end, a supporting device (62) for supporting an end portion (60*e*) of the strip element (60) and permitting movement of the end portion (60*e*) with respect to the enclosure. The supporting device (62) also provides for connecting adjacent end portions (60*e*) of strip elements (60) housed in different enclosures (4).

17 Claims, 8 Drawing Sheets

MODULAR POWER LINE FOR AN ELECTRIC VEHICLE

TECHNICAL FIELD

The present invention relates to a modular power line for an electric vehicle.

BACKGROUND ART

Power lines for electric vehicles—such as the one described in German Patent n°1.011.914 by Ludwig Reihardt, published on Jul. 11, 1957 —are known to comprise an elongated insulating enclosure closed at the top by a number of conducting plates aligned in a straight direction and insulated from one another. The enclosure houses an elastically deformable conducting strip element made of ferromagnetic material, and which is attracted by the magnetic field generated by electromagnets to flex a portion of the conducting strip element towards the conducting plates to electrically supply at least one.

French Patent n°1.151.382 by Jean-Florent DE BRUYN and Josè-Gaston DE BRUYN, published on Jan. 29, 1958, describes an electric vehicle current supply system comprising a hollow elongated insulating enclosure closed at the top by a number of conducting plates aligned in the traveling direction of the vehicle and separated by insulating elements interposed between adjacent conducting plates. The enclosure houses an elastically deformable conducting strip element extending in the traveling direction of the vehicle, and having a strip portion of ferromagnetic material on which is superimposed a strip portion of good electrically conducting material. The conducting element is attracted by the magnetic field generated by electromagnets on an electric vehicle to flex a portion of the conducting strip element towards the conducting plates to electrically supply at least one.

The power lines described in the above patents comprise a continuous conducting strip element extending the full length of the line, and which is practically impossible to produce, on account of the length of the line, and would anyway be extremely difficult to house inside the hollow enclosure. Moreover, such lines in no way provide for protecting the hollow enclosure, which is easily penetrated by external agents (such as water, vapour, dust, gas, etc.), which may damage the conducting strip element and electric contacts, or establish electric bridge connections between the conducting strip element and conducting plates.

DISCLOSURE OF INVENTION

It is an object of the present invention to provide a power line designed to overcome the drawbacks of known lines, i.e. which comprises a number of elementary modules connectable to one another and each housing a strip element of finite length. It is a further object of the present invention to provide an elementary module defining a sealed inner cavity for housing the conducting strip element.

According to the present invention, there is provided a power line of the type described in claim 1.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 2:
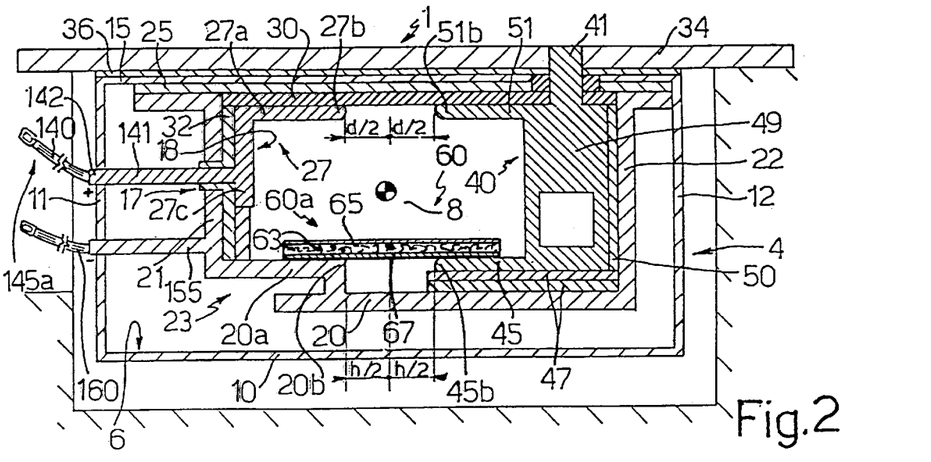
FIG. 2 shows a cross section of the power line along line II—II in FIG. 1.
Figure 3:
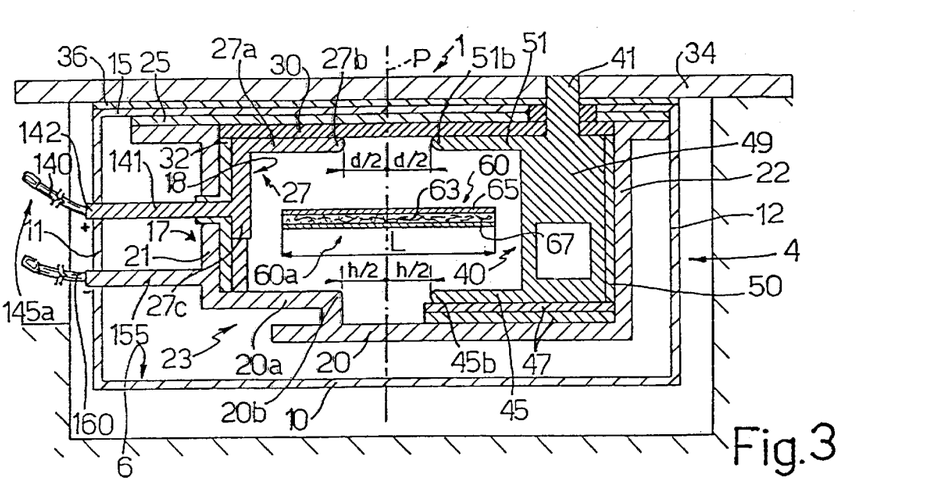
FIG. 3 shows a cross section of the power line along line III—III in FIG. 1.
Figure 4:
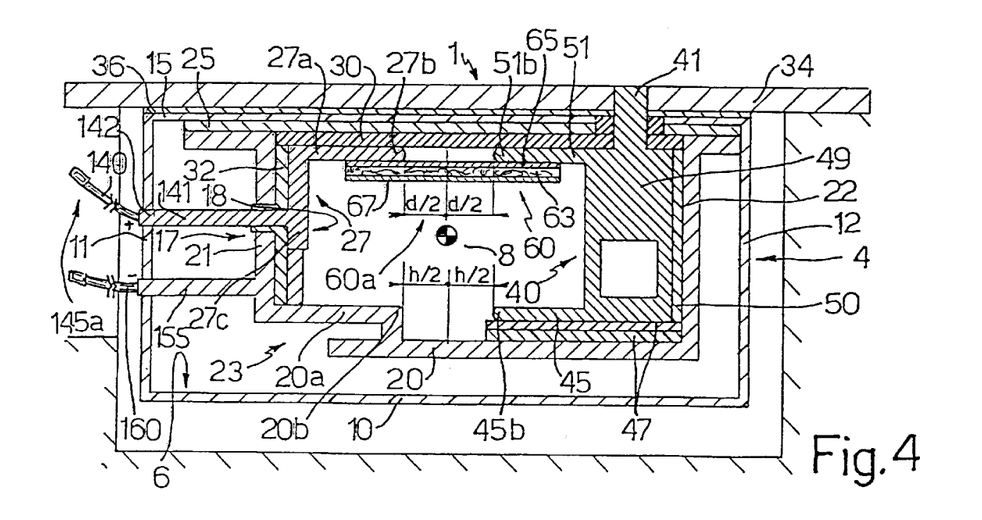
FIG. 4 shows a cross section of the power line along line IV—IV in FIG. 1.

With reference to FIGS. 2, 3 and 4, number 1 indicates as a whole a modular power line for an electric vehicle.

Power line 1 comprises a number of elongated insulating enclosures (modules) 4, each defining internally an elongated parallelepiped cavity 6 extending in a straight direction (along an axis) 8.

More specifically, each enclosure 4 is formed in one piece, and comprises a bottom horizontal insulating wall 10; two vertical lateral insulating walls 11, 12 perpendicular to wall 10; and a top horizontal insulating wall 15 parallel to and opposite bottom wall 10.

Enclosure 4 houses a metal conducting enclosure 17 defining internally an elongated parallelepiped cavity 18 extending along axis 8, and comprising a bottom wall 20 facing wall 10, two vertical lateral walls 21, 22 integral with and perpendicular to wall 20, and a flat top metal wall 25 contacting and fitted to wall 15 by fastening devices (not shown).

Enclosure 17 houses a first electric power conducting line 27 comprising a straight metal conducting element housed in a top portion of cavity 18 and separated electrically from adjacent metal walls 21 and 25. More specifically, conducting element 27 has a substantially L-shaped cross section, and comprises a flat horizontal first portion 27a adjacent and parallel to a flat insulating wall 30 underlying wall 25, and a flat vertical second portion 27c perpendicular to and integral with portion 27a and supported on a vertical insulating wall 32 parallel and adjacent to metal vertical wall 21.

Metal enclosure 17 defines a second electric power conducting line 23 extending substantially the whole length of insulating enclosure 4.

With reference to FIGS. 2, 3 and 4, power line 1 comprises a number of rectangular metal plates 34 outside enclosures 4.

More specifically, each plate 34 is fitted to top wall 15 via the interposition of a rubber sheet 36, is connected to enclosure 4 by fastening devices (not shown), and extends beyond the width of wall 15 so that end portions project from enclosure 4.

Figure 1:
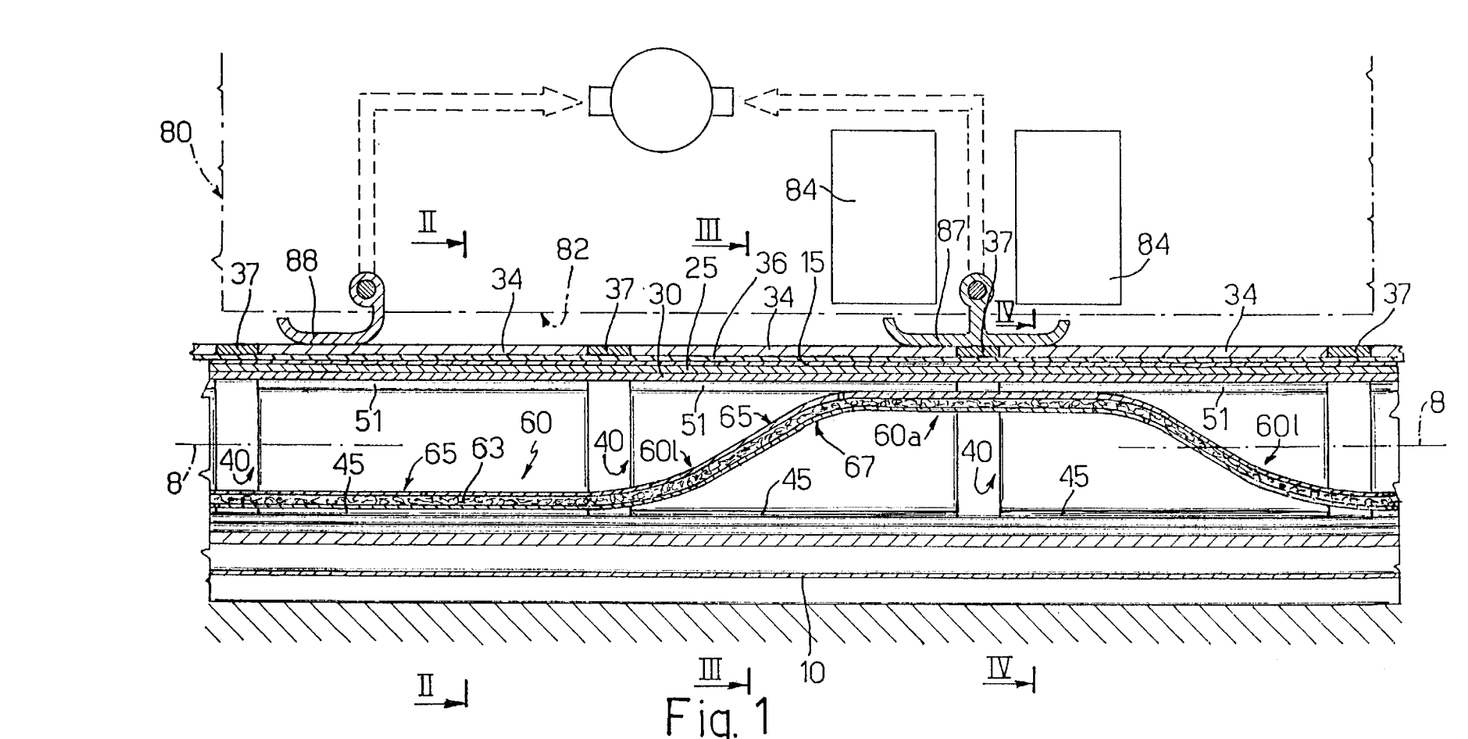
FIG. 1 shows a longitudinal section of a power line for an electric vehicle in accordance with the teachings of the present invention.

Power line 1 also comprises a number of insulating elements 37 (FIG. 1) located outside enclosures 4 and interposed between plates 34. More specifically, each insulating element 37 is interposed between and electrically separates two adjacent metal plates 34. Each metal plate 34 communicates with a respective electric feeder device 40 housed inside cavity 18 and connected to plate 34 by a respective electric conductor 41 extending through insulating wall 30, metal wall 25 (from which it is insulated), wall 15 of enclosure 4, and rubber sheet 36.

Feeder 40 substantially comprises a C-shaped metal wall in turn comprising a flat horizontal first portion 45 supported on an insulating wall 47 superimposed on metal bottom wall 20; a vertical second portion 49 facing and separated electrically from metal lateral wall 22 by an insulating wall 50; and a flat horizontal third portion 51 perpendicular to and integral with vertical portion 49 and contacting insulating wall 30.

Flat portions 51 and 45 are therefore parallel and face each other on opposite sides of cavity 18; and portions 51 and 45 of the various feeder devices 40 are spaced along axis 8 and the full length of enclosure 4 to respectively define first and second electric collectors for the purpose explained later on.

Flat portion 45 (second collector) is coplanar with a portion 20a of the second electric power line; and flat portion 45 and portion 20a are separated electrically and have respective parallel facing edges 45b and 20b equidistant (distance h/2) from the plane of symmetry P, perpendicular to walls 10 and 15, of enclosure 4.

Flat portion 51 (first collector) is coplanar with portion 27a of the first electric power line; and flat portion 51 and portion 27a are separated electrically and have respective parallel facing edges 51b and 27b equidistant (distance d/2) from plane of symmetry P.

Figure 5:
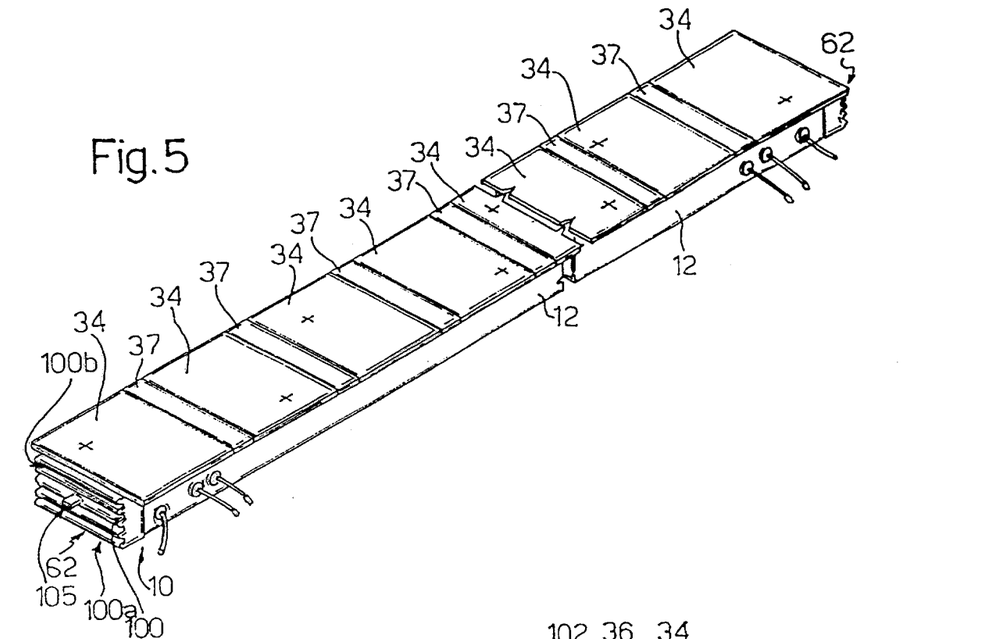
FIG. 5 shows a view in perspective of a component module of the FIG. 1 power line.
Figure 6:
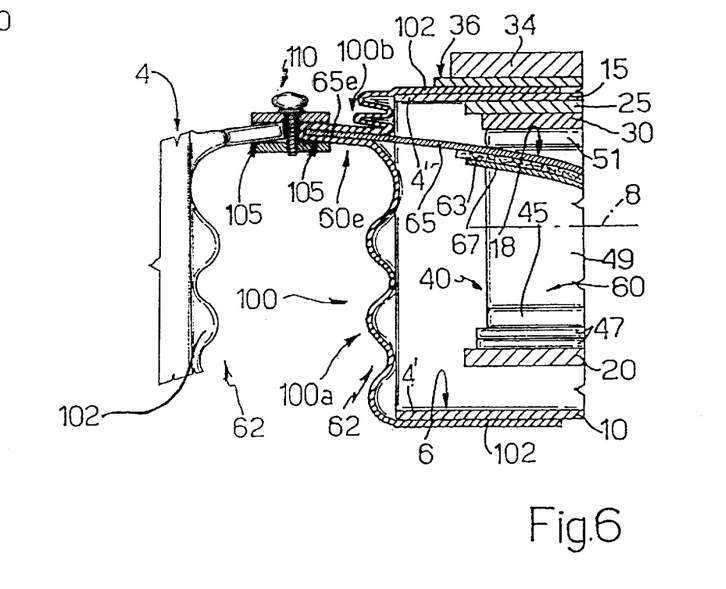
FIGS. 6 and 7 show longitudinal sections of an end portion of the FIG. 5 module in two different operating positions.
Figure 7:
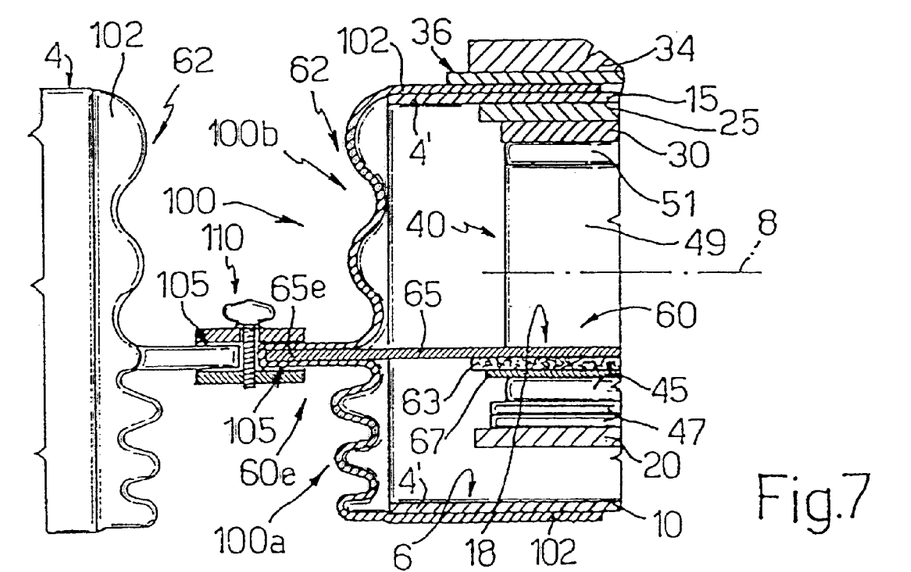

Feeder device 40 also cooperates with a conducting strip element 60, which is housed inside cavity 18, extends the full length of enclosure 4, and, when in the rest position (FIG. 2), is substantially perpendicular to and symmetrical with plane P. Conducting strip element 60 has opposite end portions 60e (FIGS. 5, 6, 7) fitted to supporting and connecting devices 62 (described in detail later on) at opposite ends of enclosure 4.

Strip element 60 comprises a central portion 63 defined by a strip of flexible insulating material supporting conducting portions on opposite sides of insulating strip 63. More specifically, insulating strip 63 supports a flexible top conducting strip 65 made of ferromagnetic material and integral with and superimposed on strip 63. Strip 65 faces wall 25 and is of a width L greater than the distance d between facing edges 51b and 27b.

Strip element 60 also comprises a bottom conducting portion defined by a metal strip 67 facing wall 20 and integral with central insulating strip 63.

Metal strip 67 is of a width L greater than the distance h between facing edges 45b and 20b.

Each insulating enclosure 4 is provided, at two opposite end portions, with respective supporting and connecting devices 62, each of which provides for supporting an end portion 60e of conducting strip element 60, while at the same time permitting a substantially transverse movement of end portion 60e as explained later on.

Each device 62 comprises a rectangular elastically deformable accordionlike wall 100 having, in cross section, an undulated profile, and comprising an elastic peripheral lip 102, which is fitted and secured firmly, e.g. by means of adhesive, to the peripheral end edges 4' of elongated parallelepiped enclosure 4.

Device 62 thus closes a respective end opening of enclosure 4 to prevent any external agents entering cavities 6 and 18.

End portion 60e of conducting element 60 is defined by a rectangular end portion 65e of flexible top strip 65, which rectangular end portion 65e projects from the ends of central insulating portion 63 and metal strip 67, and is narrower than top strip 65.

End portion 65e projects from metal enclosure 17 (FIGS. 6, 7), and is housed inside a pocket 105 defined by a hollow parallelepiped appendix extending outwards of enclosure 4 from wall 100 and open on the side facing cavities 6 and 18. Pocket 105 is located approximately at a central portion of wall 100, so that a first number of undulated portions 100a are located between pocket 105 and bottom wall 10, and a second number of undulated portions 100b are located between pocket 105 and top wall 15. Supporting and connecting device 62 also provides for connecting the conducting strip elements 60 of different insulating enclosures 4; for which purpose (FIG. 7), the end portions of insulating enclosures 4 are positioned facing each other, with parallelepiped appendixes 105 aligned and also positioned with end portions facing each other. Each parallelepiped appendix 105 (and the respective end portion 65e housed in it) is connected to the parallelepiped appendix 105 (and respective end portion 65e housed in it) of the other enclosure by means of a bridging device 110 for defining at least one restraint crosswise to direction 8.

Figure 8:
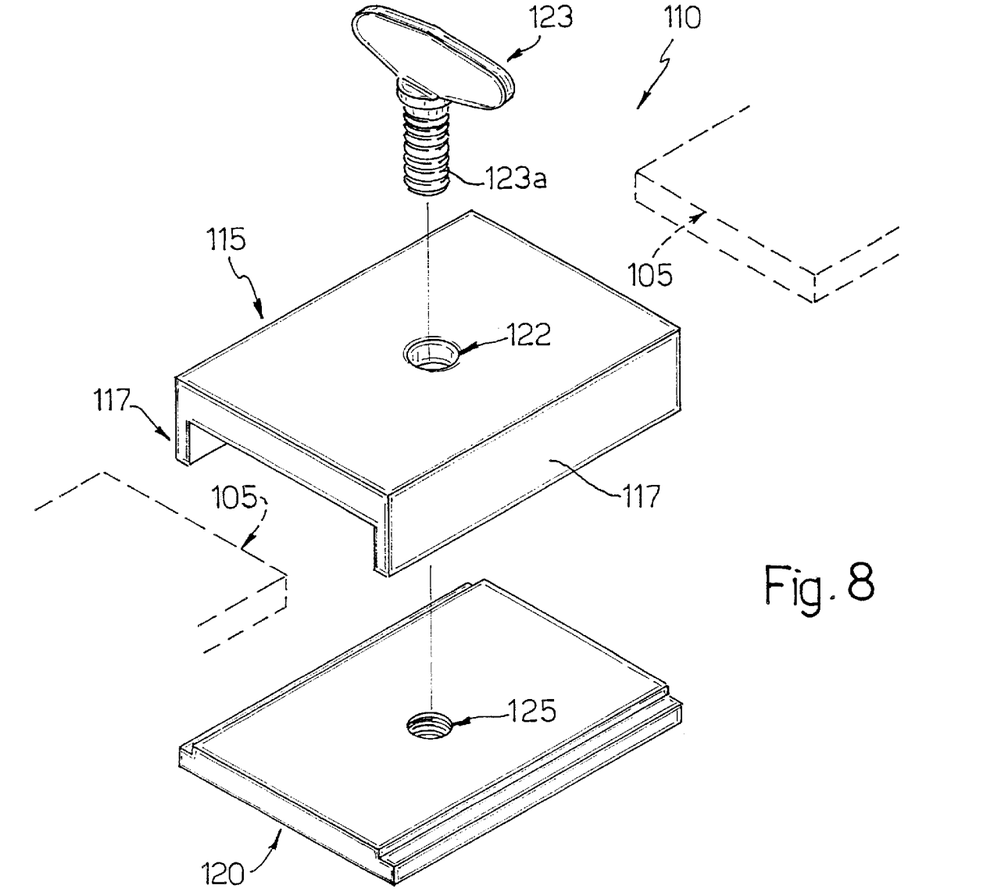
FIG. 8 shows an exploded view in perspective of a detail of the FIG. 1 power line.
Figure 9:
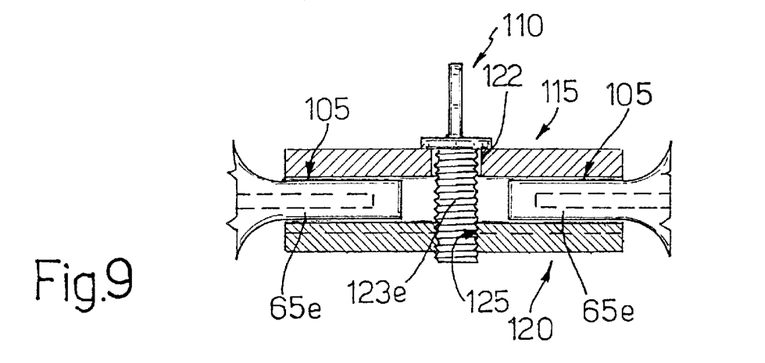
FIG. 9 shows a larger-scale cross section of the FIG. 8 detail

More specifically, bridging device 110 (FIGS. 8, 9) comprises a rectangular plate 115 with two rectangular wings 117 extending along the long sides of plate 115; and a rectangular plate 120, which is positioned facing and parallel to plate 115, with its own long edges between wings 117. Plate 115 also has a central hole 122 for housing the threaded shank 123a of a screw 123, which screws into a threaded central hole 125 formed in plate 120. Parallelepiped appendixes 105 are conveniently interposed between plates 115 and 120 and on opposite sides of screw 123, which is screwed into hole 125 to bring plates 115 and 120 closer together, to compress parallelepiped appendixes 105 between the plates, and to connect end portions 65e housed in respective appendixes 105.

Figure 10:
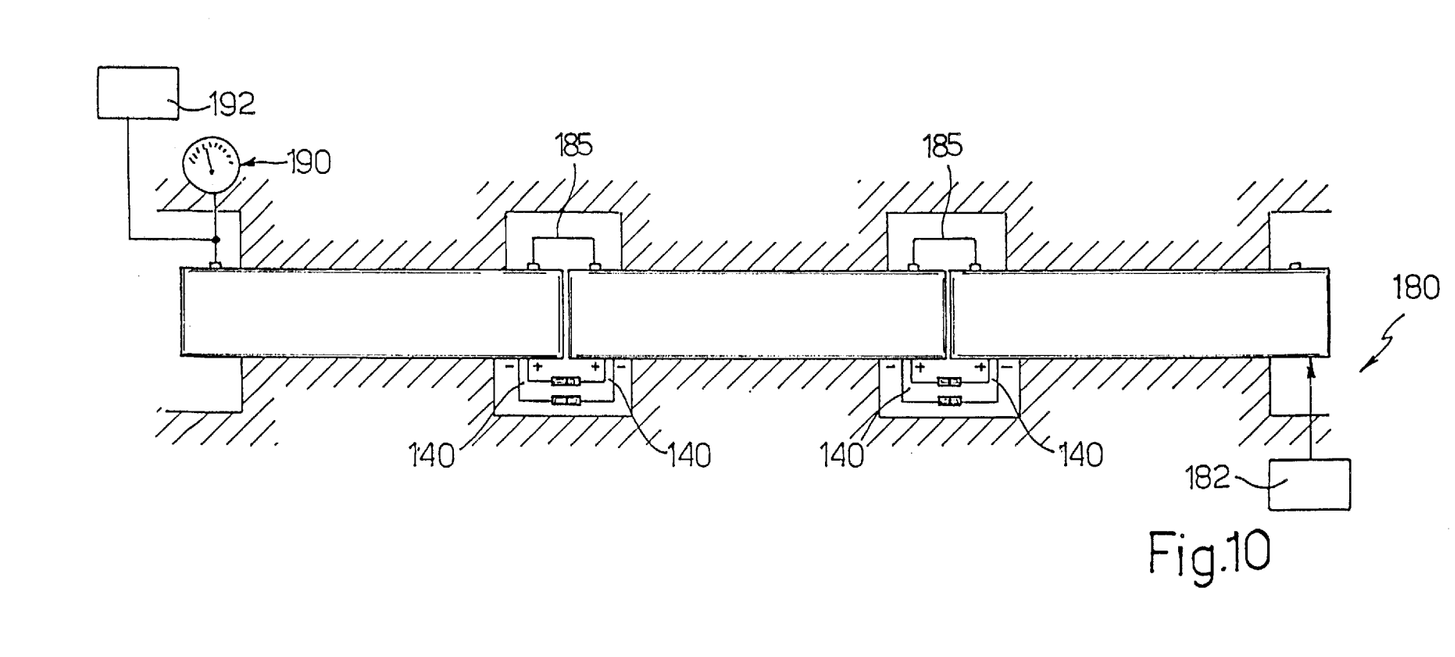
FIG. 10 shows a schematic top plan view of a line in accordance the present invention.

In actual use, power line 1 is formed by aligning a number of enclosures 4 next to one another in a straight vehicle traveling direction; each pair of adjacent end portions 60e is connected mechanically, as described, using bridging device 110 to form an overall strip element extending the full length of line 1 and defined by the conducting strip elements 60 of the various connected enclosures 4; and electric lines 27 and 23 of one enclosure are connected electrically to the corresponding electric lines of the adjacent enclosure by means of external connecting cables (shown in FIG. 10).

Figure 11:
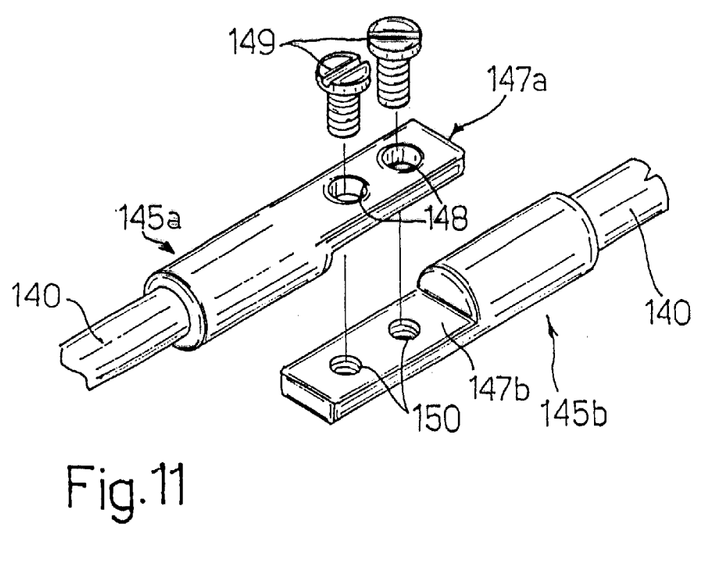
FIG. 11 shows an exploded view in perspective of a second detail of a line in accordance with the present invention.
Figure 12:
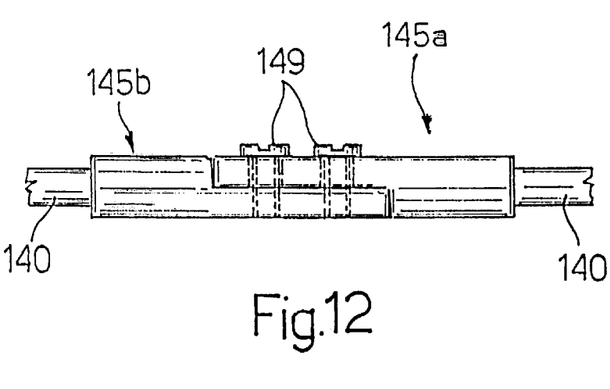
FIG. 12 shows a side view of the FIG. 11 detail.

More specifically, the end portions (not shown) of electric power line 27 are provided with respective lateral appendixes 141 (FIG. 2) extending crosswise to axis 8 and through walls 32 and 21 of enclosure 17 and lateral wall 11 of enclosure 4. Each appendix 141 is insulated electrically with respect to wall 21, extends in fluidtight manner through lateral wall 11, and defines, at the end outside enclosure 4, a connecting terminal 142 from which extends a connecting cable 140, the free end of which is fitted with an anchoring device 145a. Anchoring device 145a is connected mechanically and electrically to a similar anchoring device 145b on the end of an electric cable 140 extending from electric line 27 of another enclosure 4, and conveniently comprises (FIGS. 11, 12) a cylindrical metal body connected to one end of cable 140 and in turn comprising a flat rectangular portion 147a with two through holes 148 for housing screws 149, which screw into respective threaded holes 150 in a similar flat rectangular portion 147b of anchoring device 145b to establish electric and mechanical contact between flat portions 147a and 147b, and so electrically connect the electric power lines 27 of adjacent enclosures.

Similarly, metal enclosure 17 defining power line 23 is provided at each end with a metal lateral appendix 155, which extends in fluidtight manner through enclosure 4 and has one end, outside enclosure 4, connected to a connecting cable 160, the free end of which is fitted with an anchoring device similar to devices 145a, 145b. Connection of the end portions of cables 160 electrically connects the electric power lines 23 of adjacent enclosures.

Power line 1 also comprises a device 180 (shown schematically in FIG. 10) for controlling the fluidtight sealing of enclosures 4 of power line 1, and which comprises a compressed gas generator/feeder 182 for filling the parallelepiped cavity 6 of a first enclosure 4 with inert gas (e.g. nitrogen). Line 1 also comprises a number of bypass pipes, each of which has opposite end portions communicating with respective inner cavities 6 of adjacent enclosures, so that the inner cavities 6 of the enclosures all communicate with one another to permit dispersion of the compressed inert gas along the whole of the line. Device 180 also comprises a pressure detector 190 connected to an enclosure 4 of the line, and which provides for detecting the pressure inside cavity 6 of the respective enclosure 4 to which it is connected, and for activating a fault indicating device 192 when the measured pressure falls below a given threshold value. More specifically, when enclosures 4 of the line are fluidtight, the measured pressure is above the threshold value; whereas, in the event of leakage from at least one of enclosures 4 (e.g. due to a pierced enclosure 4 or elastic wall 100), the pressure inside line 1 falls, and the measured pressure falls below the threshold value to activate fault indicating device 192.

Purely by way of example, line 1 may be laid between the rails (not shown) of a railroad line (not shown), with enclosures 4 housed inside a parallelepiped seat (FIGS. 2–4) in the ballast (not shown). When so laid, plates 34 face upwards and are substantially coplanar with the rails (not shown). Power line 23 is conveniently connected to a ground potential, while power line 27 is connected to a positive supply potential.

Power line 1 is used in conjunction with an electric vehicle, for example, a railroad vehicle 80 (shown schematically in FIG. 1) traveling along the railroad line (not shown). Line 1 may also be laid on a roadway (not shown), with enclosures 4 housed inside a parallelepiped seat formed in the roadbed (not shown), in which case, power line 1 is used in conjunction with a wheeled electric road vehicle (not shown) traveling along the road (not shown).

Electric vehicle 80 has a central portion defined by a floor 82 facing and parallel to plates 34, and comprises, internally, a pair of electromagnets (or permanent magnets) 84 for generating a magnetic field from floor 82 towards enclosures 4.

When power line 1 is not engaged by electric vehicle 80, conducting element 60 is in a rest position (FIG. 2) in which it is substantially undeformed and parallel to bottom wall 20. More specifically, in the rest position, conducting strip 67 is substantially parallel to bottom wall 20 and rests, along the whole length of each enclosure 4, on portion 20a of power line 23 and on flat portions 45 of the various feeder devices 40, so that an electric connection is established between flat portions 45 and bottom wall 20, and therefore between all the feeder devices 40 (and plates 34) and power line 23.

When conducting strip element 60 is in the rest position, plates 34 are therefore all connected to ground potential. Line 1 is therefore intrinsically insulated, in that all the outer parts (plates 34) are at ground potential, and the live parts (lines 27) are housed inside insulating enclosures 4 (high degree of insulation of line 1) and inside metal enclosures 17 (high degree of shielding of line 1). In the rest position, (positive) electric power line 27 is in fact insulated from all the other metal parts of line 1 and housed inside metal enclosure 17. In particular, line 27 is insulated and separated physically from portion 51 (first collector).

When power line 1 is engaged by electric vehicle 80 and electromagnets 84 are active, a magnetic force of attraction is generated by the interaction between the field of electromagnets 84 and ferromagnetic conducting portion 65, so that conducting element 60 is drawn and flexed upwards towards electromagnets 84. As shown clearly in FIGS. 1, 3 and 4, the portion 60a of conducting strip element 60 affected by the force of attraction is drawn upwards into the shape of an arc towards wall 25. More specifically, portion 60a of conducting element 60 beneath electromagnets 84 (and therefore subjected to a strong force of attraction) moves into an activated position parallel and adjacent to insulating wall 30 (FIGS. 1 and 4) and with strip 65 contacting portion 27a of first power line 27 and at least one first collector 51. An electric connection is thus established, via strip 65, between first power line 27 and first collector 51, and therefore between line 27 and a plate 34. In the FIG. 1 embodiment, the shape and arrangement of electromagnets 84 are such that strip 65 contacts first collectors 51 of two adjacent feeder devices 40, so that two adjacent (live) plates 34 are connected to positive power line 27. Electric vehicle 80 comprises at least a first pickup device 87 (FIG. 1) located beneath floor 82, near electromagnets 84, to mate with live plates 34 and supply positive electric power to run electric vehicle 80.

The portions of conducting strip element 60 adjacent to portion 60a are inclined with respect to portion 60a and slant downwards by force of gravity towards wall 10. The inclined portions 60l are spaced and physically separated from first collector 51 and second collector 45 (FIG. 3), and are also spaced and separated from first power line 27 and second power line 23 (FIG. 3).

Inclined portions 60l end when conducting strip element 60 comes to rest on bottom wall 20 of second conducting line 23 and on second collectors 45 of feeder devices 40, so that all the plates 34 of line 1 which are not live are connected to conducting line 23.

Electric vehicle 80 also comprises at least a second pickup device 88 (FIG. 1) located beneath floor 82, behind/in front of electromagnets 84 in the traveling direction of the electric vehicle. Pickup device 88 mates with a plate 34 connected to line 23, and supplies negative electric power by which to run electric vehicle 80. Alternatively, pickup device 88 may mate with an external negative power line defined by a straight electric conductor (not shown) extending parallel to plates 34 and for supplying negative electric power by which to run electric vehicle 80.

As electric vehicle 80 travels along, successive portions of strip element 60 are deformed, and portion 60a, following the motion of the electric vehicle, moves along the various enclosures 4 forming part of line 1, so that the arced portion 60a of conducting strip element 60 travels wavelike along line 1, from one end to the other of each enclosure 4, and, on reaching the end portion of one enclosure 4, moves to the end portion of the adjacent enclosure 4.

Bridging device 110 provides for rigidly connecting the opposite end portions 60e of conducting strip elements 60 in adjacent enclosures 4 of modular line 1, so that, as the arced portion 60a of strip element 60 reaches the end portion of one enclosure 4, the end portion of the strip element of the next enclosure 4 is automatically flexed upwards, and the arced portion travels wavelike along the adjacent enclosures 4.

The movement of end portion 60e is made possible by the particular design of supporting and connecting device 62. More specifically, when the end portion is in the rest position (FIG. 7), the end portions 60e housed in adjacent enclosures 4 are horizontal, with metal strip 67 bridging flat portion 45 and bottom wall 20, so that portions 100a, 100b are substantially undeformed. The upward movement of end portion 60e is made possible by the elastic deformation of wall 100. That is, as end portion 60e is raised, undulated portions 100a and 100b are stretched and compressed respectively in a direction perpendicular to axis 8; and undulated portions 100a (stretched) exert downward pull on end portion 60e to assist the return downward movement of portion 60e when the magnetic force of attraction is extinguished. When end portion 60e is restored to the lowered rest position, portions 100a, 100b reassume their original undeformed position.

According to the present invention, adjacent enclosures 4 are connected to form a modular power line, i.e. defined by a number of strip elements of finite length; connection of the adjacent enclosures is straightforward and effective, to ensure the mechanical continuity of the strip element of modular line 1; and gas, water, dust or any other external agents are prevented from penetrating cavities 6 and 18, which are therefore completely airtight.

Moreover, line 1 is also so designed that all the external conducting parts (plates 34) of power line 1 are normally connected to ground potential (power conducting line 23) when line 1 is not engaged by the electric vehicle. Plates 34 are only connected to power line 27 (e.g. to a positive supply potential) when power line 1 is engaged by electric vehicle 80; and, what is more, the live plates 34 are located underneath the electric vehicle and therefore inaccessible.

Power line 1 is therefore intrinsically extremely safe (having no permanently live parts) and may even be located in places accessible to vehicle users and personnel.

Moreover, line 1 provides for continually controlling the sealing of cavities 6 of insulating enclosures 4.

What is claimed is:

1. A modular power line for an electric vehicle, comprising:
    a number of conducting elements (34) arranged in a traveling direction (8) of the electric vehicle (80) and separated electrically from one another;
    at least a first conducting line (27) supplied with a first polarity;
    a trip (60) extending in said traveling direction (8) along substantially the whole length of the power line;
    enclosure means (4) for housing said strip (60);
    said strip (60) being elastically deformable, and comprising at least one portion made of ferromagnetic material (65); said portion made of ferromagnetic material (65) interacting with a magnetic field generated by excitation means (84) carried by said electric vehicle (80) to attract at least one portion (60a) of said strip (60) into a contact position in which an electric connection (51, 65, 27) is established between said first conducting line (27) and at least one said conducting element (34);
    characterized in that said enclosure means comprise a number of separate enclosures (4), each defining a respective elongated inner cavity (6, 18) housing a strip element of finite length of said strip (60); each end of each said enclosure (4) having a respective supporting and connecting device (62) for supporting an end portion (60e) of said strip element of finite length, and for permitting movement of said end portion (60e) with respect to the enclosure (4); said supporting and connecting device (62) also connecting to an adjacent end portion (60e) of an adjacent trip element of a finite length of said strip (60) housed in an adjacent one of said enclosures, and permitting movement of said adjacent end portion (60e).

2. A power line as claimed in claim 1, characterized in that said supporting and connecting devices (62) also provide for fluidtight sealing said inner cavity (6, 18).

3. A power line as claimed in claim 1, characterized in that the supporting and connecting device (62) comprises at least an elastically deformable wall (100) located at said end of said enclosure (4) and supporting (105) said end portion (60e) of said strip element; a deformation of said wall (100) permitting said movement of said end portion (60e) with respect to said enclosure (4).

4. A power line as claimed in claim 3, characterized in that said elastically deformable wall comprises an elastic accordionlike wall having, in cross section, an undulated profile, and having a peripheral portion (102) connected in sealed manner to said enclosure (4); said accordionlike wall having pocket means (105) for housing said end portion (60e) of said strip element.

5. A power line as claimed in claim 4, characterized in that said pocket means (105) comprise a hollow parallelepiped appendix extending outwards of the enclosure (4) from said deformable wall (100) and open on a side facing said cavity (6, 18).

6. A power line as claimed in claim 4, characterized in that said pocket means (105) are located approximately at a central portion of said deformable wall (100).

7. A power line as claimed in claim 6, characterized in that the supporting and connecting devices (62) also comprise bridging means (110) which are interposed between adjacent end portions (60e) of adjacent strip elements of said strip (60) and define, for said adjacent end portions (60e), at least one restraint crosswise to said traveling direction (8).

8. A power line as claimed in claim 7, characterized in that said bridging means (110) are interposed between said adjacent end portions (60e); each said adjacent end portion (60e) being contained at least partly in said wall (100).

9. A power line as claimed in claim 7, characterized in that said bridging means (110) are interposed between said pocket means (105) housing said adjacent end portions (60e).

10. A power line as claimed in claim 7, characterized in that said bridging means comprise at least first (115) and second (120) plate bodies, and relative-position regulating means (123) interposed between said first (115) and second (120) plate bodies; said adjacent end portions (60e) being housed firmly between said first (115) and second (120) plate bodies.

11. A power line as claimed in claim 10, characterized in that said conducting elements (34) comprise plates electrically separated from one another and carried by said enclosure means (4).

12. A power line as claimed in claim 11, characterized in that each said conducting element (34) communicates electrically (41) with first collector means (51) and second collector means (45) housed in said cavity (6, 18);

said cavity (6, 18) also housing said first conducting line (27) and a second conducting line (23) separated from the first conducting line (27);

said strip element establishing an electric contact between said second conducting line (23) and said second collector means (45) during the portions of said strip element (60) in a rest position in which the strip element (60) is elastically undeformed and rests on said second collector means (45) and on said second conducting line (23); and said strip element (60) establishing an electric contact between said first conducting line (27) and said first collector means (51) during the portions of said strip element (60) in said contact position.

13. A power line as claimed in claim 12, characterized in that said first collector means (51) and said second collector means (45) comprise flat conducting portions housed in said cavity (6, 18) and facing each other on opposite sides of the cavity (6, 18);

said first conducting line (27) and said second conducting line (23) comprising respective flat elongated conducting portions (27a, 20a) housed facing each other inside said cavity (6, 18) and extending substantially the whole length of said enclosure (4);

said strip element comprising:
  striplike insulating means (63) extending substantially the whole length of said enclosure (4) and between said supporting and connecting devices (62);
  said ferromagnetic material carried on a first side of said striplike insulating means (63) and facing said first collector means (51) and said first conducting line (27);
  at least one second conducting element (67) carried on a second side of said striplike insulating means (63) and facing said second collector means (45) and said second conducting line (23);
  said second conducting element (67) establishing an electric bridge connection between said second conducting line (23) and said second collector means (45) during the portions of said strip element (60) in said rest position; and
  said ferromagnetic material establishing an electric bridge connection between said first conducting line (27) and said first collector means (51) during the portions of said strip element (60) in said contact position.

14. A power line as claimed in claim 13, characterized in that said first conducting line (27) comprises a contact portion (27a) substantially coplanar with a contact portion (51) of said first collector means (51);

said first conducting elements (65) being of a width (L) greater than a distance (d) between adjacent edges (51b, 27b) of said contact portions of said first collector means (51) and said first conducting line (27);

said ferromagnetic material being interposed, during the portions of said strip element in said contact position, between said contact portion of the first collector means (51) and the contact portion of the first conducting line (27).

15. A power line as claimed in claim 13, characterized in that said second conducting line (23) comprises a contact portion (20a) substantially coplanar with a contact portion (45) of said second collector means;

said second conducting element (67) being of a width (L) greater than a distance (h) between adjacent edges (45b, 20b) of said contact portions of said second collector means (45) and said second conducting line (23);

said second conducting element (67) being interposed, during the portions of said strip element in said rest position, between said contact portion of the second collector means (45) and said contact portion (20a) of the second conducting line (23).

16. A power line as claimed in claim 15, characterized in that each said enclosure comprises electric interconnecting means (140, 141, 142, 145a, 145b) communicating electrically (141) with said first conducting line (27) and extending in fluidtight manner through said enclosure; said electric interconnecting means (140, 141, 142, 145a, 145b) having at least one connecting terminal (142) outside said enclosure and said connecting terminal is connected electrically (140, 145a, 145b) to a similar terminal (142) forming part of another one of said enclosures (4) and said electric interconnecting means communicating with portions of said first conducting line of different enclosures (4).

17. A power line as claimed in claim 16, characterized by comprising test means (180) for controlling fluidtight sealing of the enclosures (4); said test means (180) comprising:
  compressed gas supply means (182) for feeding inert gas into the cavity (6) of at least one said enclosure (4);
  bypass means (185) interposed between said cavities (6) of the enclosures; and
  pressure detecting means (190) connected to said enclosure (4) to detect a pressure inside at least one said enclosure (4), and to generate a fault signal (192) when a measured pressure falls below a threshold value.

* * * * *